R. S. HALL.
Fruit Gatherer.
No. 78,662.
Patented June 9, 1868.
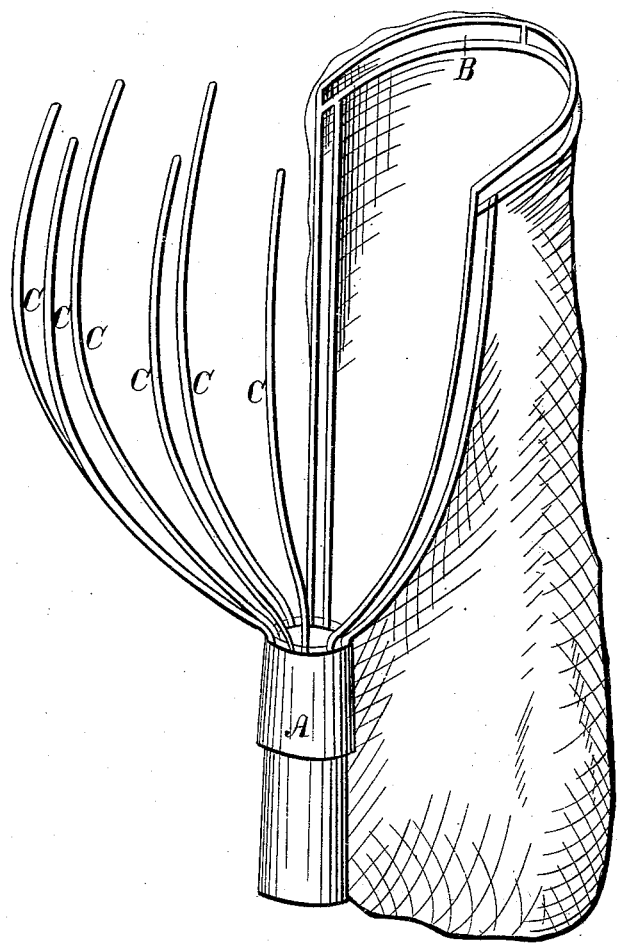
WITNESSES:
INVENTOR:

United States Patent Office.

REUBEN S. HALL, OF HAMBURG, MICHIGAN.

Letters Patent No. 78,662, dated June 9, 1868.

IMPROVEMENT IN FRUIT-GATHERER.

*The Schedule referred to in these Letters Patent and making part of the same.*

TO WHOM IT MAY CONCERN:

Be it known that I, REUBEN S. HALL, of Hamburg, in the county of Livingston, in the State of Michigan, have invented a new and useful Improvement in Fruit-Gatherers; and I do declare that the following is a true and accurate description thereof, reference being had to the accompanying drawings, and to the letters of reference marked thereon, and making a part of this specification.

The object of this invention is to provide a cheap and expeditious method of picking fruit from any part of a tree, and landing the same upon the ground without bruising, and at the same time to allow the operator to remain upon the ground.

Having thus described the object, I will now explain the construction of my invention, so that those skilled in the art can manufacture it, especial reference being made to the accompanying drawing, which fully shows its construction.

A represents a ferrule or tip, to be attached to a proper pole or handle, of any suitable length.

B is a double rim, to which to attach a proper conductor, made of any textile fabric, and of any suitable length, to conduct the fruit to the ground.

C C, &c., are curved rods, made of strong wire or any other suitable thing, fastened by soldering, welding, or otherwise, to the top of the ferrule or tip A.

It will be seen that the wires C extend in semicircular form, while the rim B projects outwards, and is supported by the end wires. At a point opposite to the semicircular wires, a space is left, which is to be occupied by the bag or conductor, and does not interfere with any of the wires.

The fruit is easily struck by the wires, and then falls directly into the bag, which is supported by the rim, and this rim, also, may be employed to strike the fruit, but in either case the fruit falls right into the bag.

To use my invention, it is only necessary to attach to it a proper handle, and suitable conductor, when the fruit-gatherer is perfect in all its parts.

I disclaim the invention of the conductor, made of a textile fabric, as I am aware that has been used for many years.

What I claim as my invention, and desire to secure by Letters Patent, is—

The combination and arrangement of the semicircular wires C, the outwardly-projecting rim B, and the bag or conductor, as herein represented.

R. S. HALL.

Witnesses:
H. S. SPRAGUE,
WM. A. KRAG.